UNITED STATES PATENT OFFICE.

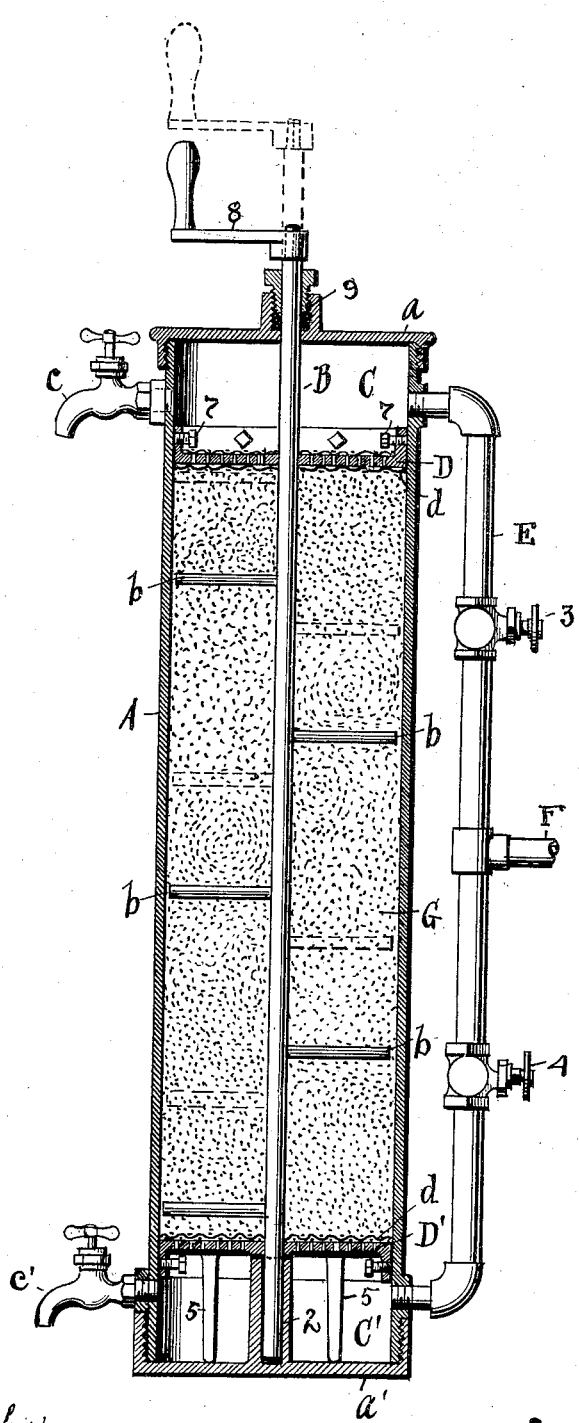

LYMAN C. HARTSOUGH, OF McKEES ROCKS, PENNSYLVANIA.

WATER-FILTER.

No. 862,156.  Specification of Letters Patent.  Patented Aug. 6, 1907.

Application filed March 5, 1906. Serial No. 304,180.

*To all whom it may concern:*

Be it known that I, LYMAN C. HARTSOUGH, a citizen of the United States, residing at McKees Rocks, in the county of Allegheny and State of Pennsylvania, have invented certain new and useful Improvements in Water-Filters; and do declare that the following is a full, clear, and exact description of the invention, which will enable others skilled in the art to which it appertains to make and use the same.

My invention relates to water filters, and the single figure in the drawing herewith represents a central longitudinal sectional elevation of a filter embodying my invention.

As thus shown A is a cylindrical casing having removable caps $a$ and $a'$ at its respective ends.

B represents an agitator shaft having fingers or spurs $b$ here and there in staggered relation between its ends for the purpose of agitating the filtering media or material. This material preferably is of a comparatively fine quality of sand, and within the casing A and removed from the respective ends thereof are perforated plates or diaphragms D and D', spanning the said casing and secured thereto by bolts or the like, and a suitable screen of wire gauze or its equivalent and a porous lining $d$ is laid upon or over these diaphragms on the inside so as to confine the filtering material between them. This leaves open fluid chambers C and C', respectively, at the ends of cylinder A which have faucets $c$ and $c'$ connected therewith.

The agitator B is projected centrally through cylinder A from the top thereof into a lengthened tubular bearing 2 with cap $a'$ at the bottom and standing up in the fluid space C' beneath diaphragm D', which rests thereon and which has a central perforation for the passage of shaft B into said bearing 2. At its upper end the said shaft projects outside the cap A and is packed in said cap to prevent leakage but is otherwise free to permit the said shaft and its agitating fingers to be moved lengthwise in the cylinder for more perfectly agitating the stirring or filtering media when it comes to cleansing the same, and the dotted lines respectively connected with said shaft and fingers indicate the position of the shaft when it is drawn out as far as it can go and for which the tubular bearing 2 makes accommodation, as well as serving as a support or rest for diaphragm D' upon which the weight of the sand and water come when the filter is at work.

Fluid communication is made with the respective end chambers C and C' through the pipe E, which communicates with said chambers at ends, and F is the supply pipe to pipe E. Two valves, 3 and 4, respectively, are provided on opposite sides of the fluid inlet pipe F, so as to have cut-offs in either direction as the use of the filter may require. For example, 
when the filter is at work, as ordinarily, valve 4 is closed and valves 3 is open, and the fluid to be filtered enters chamber C whence it works under pressure through the filtering media into the bottom chamber C'. But it becomes necessary to cleanse filters of this kind, as well as others, and for this purpose I have simply to reverse the flow of the pressure fluid through the filter by closing valve 3 and opening valve 4 and faucet $c$ at the top of the filter. Fluid pressure is thus reversed and the accumulations here or there are carried off and out through faucet $c$, and as this is going on the sand is not only agitated but the shaft B is designed to be moved lengthwise to one position or another so as to agitate all parts of the body of sand within the said diaphragm D and D'. It requires but a short time to cleanse the filtering media and screens. When this is done valve 4 is again closed and valve 3 opened and the fluid is carried directly through into the upper chamber $c$ and thence down through the filtering media as before. Obviously, if it were desirable to draw off water without filtering it could be done by simply using faucet $c$ and obviously, also, the flow of water will be more rapid through this direction than to carry it through the packed and otherwise compact or solid body of sand. My practice is to tamp or pack the sand between the diaphragm D and D' as firmly as possible, and when this is done the diaphragm D is put in place at the top upon the packed body and cap $a$ is screwed on and the filter is ready to work. If desired I may also have legs or supports 5 on the bottom for diaphragm D', but with the tubular support 2 these may not be needed.

It will be noticed that diaphragms D and D' are set back within reach from the outside at each end of the filter cylinder and the caps $a$ and $a'$ can be removed without interfering with the water pipes or connections. It is also designed to have a closely packed filtering media G, and when such packing is effected the diaphragm D is crowded down thereon and locked by screws 7. Handle 8 on shaft B is removable, so that the cap $a$ can be inserted over the same and the packing 9 be tightened after the parts are put in working position.

The filtering media may be changed by simply removing cap $a$, diaphragm D and agitator B from the top, and the lower end of agitator shaft B extends into lower chamber C' far enough to allow for all the longitudinal adjustment thereof needed.

What I claim is:—

In a domestic water filter a cylinder having a removable cap screwed upon each end over the outside thereof, open work diaphragms inward from each end spanning said cylinder and provided with flanges and set screws for fixing said diaphragms removably in place, a filtering medium between said diaphragms, the spaces between said diaphragms and said removable caps constituting fluid chambers, a fluid supply pipe opening into each of said fluid chambers, and an agitator having fingers to stir the filtering medium and adapted to have lengthwise movement with limits in said cylinder while agitation thereby occurs, one of the caps at the cylinder ends having a tubular central bearing for the agitator of a length to permit of such lengthwise movement of the agitator, the lower of said diaphragms being provided with projections resting directly upon the bottom of the said cylinder, whereby a support is provided for the filtering medium above said diaphragm.

In testimony whereof I sign this specification in the presence of two witnesses.

LYMAN C. HARTSOUGH.

Witnesses:
R. B. MOSER,
H. T. FISHER.